July 12, 1927. 1,635,689
J. D. RAUCH
TURNTABLE BEARING DEVICE
Filed July 27, 1925
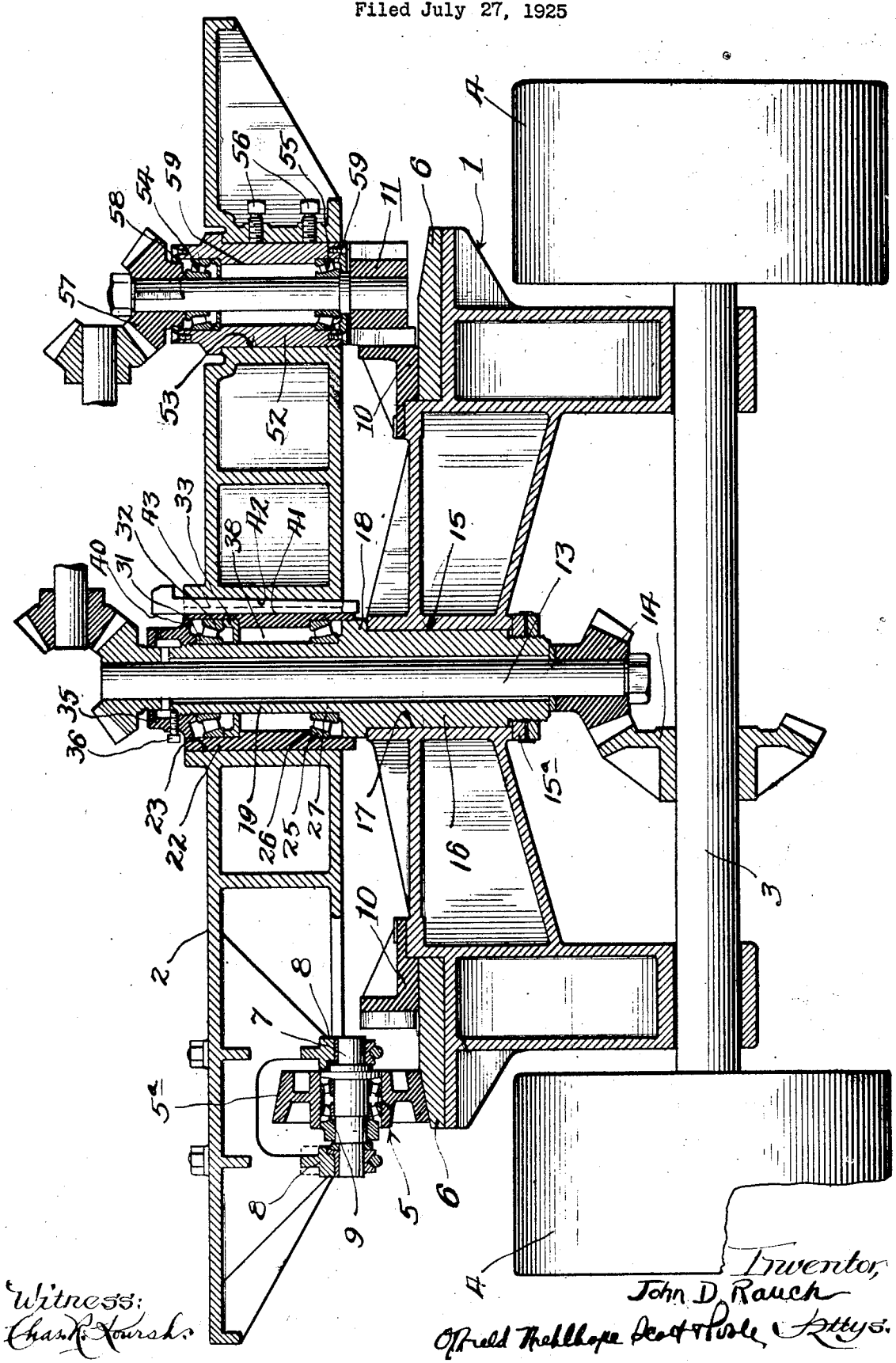
Witness:
Chas. R. Loursh.
Inventor,
John D. Rauch
Offield Hochhope Scott & Poole, Attys.

Patented July 12, 1927.

1,635,689

UNITED STATES PATENT OFFICE.

JOHN D. RAUCH, OF LIMA, OHIO, ASSIGNOR TO THE OHIO STEAM SHOVEL COMPANY, OF LIMA, OHIO, A CORPORATION OF OHIO.

TURNTABLE BEARING DEVICE.

Application filed July 27, 1925. Serial No. 46,194.

This invention relates to improvements in bearing devices for turntables and the like, and more particularly to antifriction roller bearings applied to relatively heavy machinery parts, such as turntables used in power shovels, cranes or similar heavy duty apparatus which are subject to withstand great loads and are usually subject to excessive wear and require frequent lubrication.

The principal object of my invention is to provide an improved construction of turntables of the character described wherein the central axial bearing is provided with an improved construction of roller bearings which require only a simple machining operation of the relatively heavy parts of the turntable and which will automatically compensate for wear of the main supporting rollers which support the major portion of the weight of such turntables.

A further object is to produce a structure in which the turntable may be readily dismantled for convenience in shipping or making necessary repairs. My invention may also be applied to other bearing devices adapted to extend through heavy machine parts, such as turntable bases, as will hereinafter more fully appear.

The invention may best be understood by reference to the accompanying drawing, in which the single figure illustrates one embodiment thereof as applied to the base frame and turntable of a mobile power shovel, but with the operating parts and the superstructure above the turntable being omitted.

Referring to details shown in the drawings, the main elements comprise a base frame 1 and turntable 2 and supporting means for the base frame comprising axle 3 journalled in the base frame and provided with wheels 4—4 adapted for supporting engagement with the ground. In the form shown, the turntable 2 is provided with the usual form of main load-bearing support consisting of a plurality of wheels 5 of which one is shown. Each of the wheels has a tapered periphery 5ª engaging an annular tapered ring or track 6, said ring being continuous about the base 1. The wheels have suitable supporting devices connected with the turntable, as herein shown, said wheels each having a shaft 7 secured in pedestals 8—8 of said turntable and having roller bearing devices 9 interposed between said shaft and the body of the wheel. The turntable shown also has means for rotating it bodily about its axis, comprising a ring gear 10 on the base 1 engaged by a pinion 11 on shaft 12, the latter shaft extending vertically through the body of the turntable and provided with roller bearings, as will hereinafter be described in detail.

Referring now to the construction forming the subject matter of the present invention, the turntable is provided with vertically disposed axial bearing devices, associated with a vertically disposed member 15, concentric with the turntable and through which extends a driving shaft 13 forming a driving connection between the mechanism on the turntable and the axle 3, through suitable gears 14, 14. The member 15 is provided with a lower portion 16 fitting in a socket 17 formed in the center of the base and suitably secured by a nut 15ª. Said member 15 has an enlarged annular portion or shoulder 18 resting upon the upper margin of the socket 17. Projecting upwardly from the enlarged portion 18 is a cylindrical stud 19 of reduced size. A sleeve 22 is fitted in a bore 23 in the turntable concentric with the axis thereof and spaced from the stud 19 of the centrally supporting member 15. Roller bearing devices are interposed between the sleeve 22 and the center supporting stud 19, in the form shown two sets of roller devices of the tapered roller type being utilized. The lower set comprises an outer race 25 engaging a downwardly facing shoulder 26 formed on the inner face of the sleeve 22 and a coacting inner race 27 fitting around the center stud 19 engaging the upper face of the roller 18 thereof. The upper set of roller bearing devices comprises outer race 30 and inner race 31 interposed between sleeve member 22 and stud 19 adjacent the upper end thereof, in the form shown the outer race 30 resting on a flanged ring member 32 which in turn is supported on upwardly facing shoulder 33 on the inner side of sleeve 22.

Suitable adjusting means for the roller bearings are provided, as for example, a collar 35 is threaded on the upper end of the stud 19 and engages the upper face of the inner roller race 31. A set screw may be provided for retaining the adjusting collar 35 in proper adjusted position relative to the stud 19.

It will be observed that the space between the sleeve 22 and stud 19 forms a reservoir 38 for lubricating means, such as grease, which may be supplied to the bearings through an opening 40 in the collar 35 and working downwardly around the plate 32 to the lower roller bearing, the ring 32 forming a baffle to retain a portion of the grease for the upper bearing. With such an arrangement the bearings need only be packed with lubricant at infrequent periods, instead of requiring the application of lubricant several times a day as is the case with ordinary bearings in this type of heavy duty machine.

It will be further understood that the bearing wheels 5 and track 6 are subject to wear during the operation of the machine. This wear is compensated for in the construction shown by providing the sleeve 22 in loose fitting engagement in the turntable bore 23 and furnishing cooperating keyways 41 and 42 in the sleeve and turntable respectively in which is fitted a sliding key 43, preferably tapered toward the lower end, as shown. With this construction it will be observed that as the turntable settles toward the main frame 1 due to wear of the main supporting rollers and roller track, as just described, the turntable will slip downwardly relative to the sleeve 22 while the key 43 will readjust itself to each new position of the parts. In this manner the wear is automatically compensated for without necessitating any care or readjustment, and without affecting the adjustment of the roller bearing devices within the sleeve. The only adjustment of the latter bearings which may be required is that due to natural wear upon them independently of the wear on the main supporting rollers 5ª and its associated track 6.

The bearing assembly comprising the sleeve 22 and stud 19 arranged as described, is particularly advantageous in its application to heavy machine parts such as the turntable herein shown, inasmuch as it requires a minimum amount of machining of the heavy turntable itself, consisting only of a straight bore 23 and keyway 42, and this machining may be comparatively rough and within wide tolerances. The finer machining operations, such as may be desirable for fitting the roller bearing races together in the final assembly, may be carried out on the relatively smaller sleeve 22 and stud 15 which are much more readily handled on turning lathes.

A further advantage of construction shown is that it permits the turntable to be easily dismantled for shipping or making necessary repairs, and without disturbing the arrangement of the roller bearings. Thus, it is practical to remove the turntable from the sleeve 22 by removing the key 43 and jacking the turntable vertically over the sleeve, so that the entire turntable and super structure may be readily removed from the truck. Furthermore, the entire center pin or member 15 can be withdrawn from above by the removal of the key 43 and the nut 15ª and bevel gear 14 just below the same. This is especially advantageous in case it is necessary to make repairs to the roller bearings, since the entire center unit can be removed without disturbing the relation of the truck and the turntable.

A bearing assembly similar to that above described in connection with the central axial bearing may also be advantageously applied to shafts extending through the relatively heavy turntable at points other than the center thereof, as for instance, in connection with the bearing shaft 12 which rotates the turntable relative to the base, as already described. In the form shown, the bearing device comprises a sleeve 52, which may be similar in construction to the sleeve 22 on the central bearing and is seated in the bore 53 formed in the turntable. Roller bearing devices 54 and 55 are provided at the top and the bottom of sleeve 52, the construction thereof being also similar to the roller bearings described in connection with the central bearing about stud 19, with the exception that the inner bearing races are carried directly on the shaft 12 instead of on the stud 19. In the case of sleeve 52 no vertical adjustment thereof is necessary, so said sleeve may have permanent adjustment with respect to the turntable, as by means of set screws 56—56. Adjustment means for the roller bearing devices are also afforded, in the present instance by the bevel gear 57 which is keyed to the shaft 12 and bears on the inner roller race of the upper bearing 54. Said bevel gear may be adjusted vertically by a threaded nut 57ª threaded on the upper end of the shaft. Suitable caps 58 and 59 are secured at opposite ends of the sleeve 52 for providing a closed reservoir for lubricant, which may be supplied thereto through hole 59. As in the case of the centrally disposed bearing assembly surrounding stud 19, this form of assembly within the sleeve 52 is advantageous in connection with heavy machine parts such as described, for the reason that it requires a minimum amount of machining of the turntable itself, only a straight bore 53 being required. This construction also permits the entire shaft assembly including the pinion 11 to be withdrawn upwardly through the turntable for repairs or shipment without disturbing the relationship of the adjacent parts including the turntable or the base.

Although I have shown and described one embodiment of my invention, it will be understood that I do not wish to be limited to the exact construction illustrated and described, but that various changes and modifications may be made without departing from the spirit and scope of the invention.

Having therefore described the construction and operation of my invention, I claim:

1. A bearing support for heavy machine parts comprising a frame member having an upright bore therethrough, a sleeve fitting in said bore and slidable axially therein, a spindle extending coaxially within said sleeve and rotatable with respect to said frame, a thrust bearing interposed between said spindle and sleeve, and means restraining rotation of said sleeve in said bore but permitting relatively free vertical movement thereof whereby said frame may be automatically readjusted by gravity to compensate for wear of said thrust bearing.

2. A bearing support for heavy machine parts comprising a frame member having an upright bore therethrough, a sleeve fitting in said bore and slidable axially therein, means for locking said sleeve from rotation in said bore comprising a key loosely fitting to permit relative longitudinal movement of said sleeve and frame, a spindle extending coaxially within said sleeve and rotatable with respect to said frame, and a pair of longitudinally spaced anti-friction roller bearing devices interposed between said spindle and said sleeve.

3. A bearing support for heavy machine parts comprising a frame member having an upright bore therethrough, a sleeve fitting in said bore and slidable axially therein, means for locking said sleeve from rotation in said bore comprising a key loosely fitting to permit relative longitudinal movement of said sleeve and frame, a spindle extending coaxially within said sleeve and rotatable with respect to said frame, and a pair of longitudinally spaced anti-friction roller bearing devices including inner and outer races, said inner races fitting in sliding engagement on said spindle and said outer races engaging a pair of outwardly facing shoulders formed in said sleeve.

Signed at Lima, Ohio, this 16 day of July, 1925.

JOHN D. RAUCH.